United States Patent [19]

Nobe et al.

[11] Patent Number: 5,244,985

[45] Date of Patent: Sep. 14, 1993

[54] EPOXIDIZED POLYESTERS AND METHOD OF PRODUCTION THEREOF

[75] Inventors: Tomio Nobe, Yawata; Hiroyuki Kanamaru, Kyoto; Harutomo Nomoto, Jyoyo; Shoji Tani, Nishinomiya, all of Japan

[73] Assignee: New Japan Chemical Co., Ltd., Kyoto, Japan

[21] Appl. No.: 857,247

[22] Filed: Mar. 25, 1992

[30] Foreign Application Priority Data

Mar. 29, 1991 [JP] Japan ................... 3-092884

[51] Int. Cl.$^5$ ............................................ C08F 20/00
[52] U.S. Cl. ..................... 525/437; 528/272; 528/274; 528/286; 528/293; 528/299; 528/296; 528/297; 528/298; 528/300; 528/302; 528/303; 528/306; 528/307; 528/308; 528/308.6; 528/356; 528/491; 525/448; 525/450; 525/45; 524/81; 524/174; 524/284; 524/401
[58] Field of Search ............... 528/272, 274, 286, 293, 528/295, 296, 297, 298, 300, 302, 303, 306, 307, 308, 308.7, 356, 491; 525/437, 448, 450, 451; 524/81, 174, 284, 401, 414, 442

[56] References Cited

U.S. PATENT DOCUMENTS 4,222,927  9/1980  Schulz-Walz et al. ............. 524/604
4,240,938  12/1980  Kraft et al. ........................ 524/109

Primary Examiner—Samuel A. Acquah
Attorney, Agent, or Firm—Larson and Taylor

[57] ABSTRACT

Disclosed are an epoxidized polyester which comprises, per molecule, at least three bifunctional groups each having the general formula

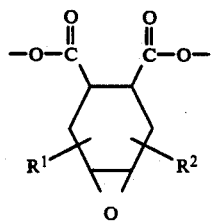

(I)

wherein $R^1$ and $R^2$ are the same or different and each is a hydrogen atom or an alkyl group containing 1 to 5 carbon atoms, or $R^1$ and $R^2$ taken together represent an endomethylene group, and which has a number average molecular weight of about 1,000 to about 10,000, as well as processes for preparing the epoxidized polyester.

29 Claims, No Drawings

EPOXIDIZED POLYESTERS AND METHOD OF PRODUCTION THEREOF

FIELD OF THE INVENTION

This invention relates to epoxidized polyesters suited for use, inter alia, as constituents of cationically polymerizable resins, ultraviolet-curable resins, epoxy resins and the like and as stabiliziers for polyvinyl chloride resins, and to a method of producing such polyesters.

BACKGROUND OF THE INVENTION

Compounds containing at least one alicyclic epoxy group are highly capable of cationic polymerization as compared with olefinic epoxy groups and glycidyl type epoxy groups and, therefore, they are materials suited for use in cationically polymerizable resin compositions or cationically polymerizable ultraviolet-curable resin compositions. They are reactive with acid anhydride type curing agents or amine type curing agents and therefore are in wide use as diluents for epoxy resins. They are also used as stabilizers for polyvinyl chloride resins.

Hithertofore various compounds have been designed as such alicyclic epoxy-containing compounds, the starting materials being butadiene, cyclohexenecarbinol, cyclohexenedicarbinol, cyclohexenylaldehyde, cyclohexenecarboxylic acid, tetrahydrophthalic anhydride, dicyclopentadiene, cyclopentadiene and the like. However, most of the compounds contain at most two alicyclic epoxy groups per molecule and have molecular weights less than 1,000.

Our research has revealed the following facts. Such alicyclic epoxy compounds as mentioned above are low in molecular weight and have a low viscosity. Therefore, when used as diluents for epoxy resins, they disadvantageously give brittle cured products although they function as good diluents. Similarly, when used as constituents of cationically polymerizable resins or cationically polymerizable ultraviolet-curable resins, they give only brittle cured products, lacking in flexibility, presumably because they have a low molecular weight and contain an insufficient number of alicyclic epoxy groups per molecule. Furthermore, the cured products have insufficient water resistance. When used as stabilizers for polyvinyl chloride resins, they are disadvantageous in that they have high solvent extraction and migration potentials because of low molecular weights. Furthermore, articles produced by using such compounds for the purposes mentioned above are used outdoors in many instances and, in such instances, it is a prerequisite that the alicyclic epoxy compounds as raw materials should also have weather resistance. However, none of the alicyclic epoxy compounds so far known can solve these problems. The advent of a compound that can solve the problems is therefore earnestly awaited.

The present inventors made intensive investigations in an attempt to propose alicyclic epoxy compounds with which the problems mentioned above could be solved and, as a result, found that epoxidized polyesters having a certan specific structure can achieve the intended object. Based on this finding, they have now completed the present invention.

On the other hand, the present inventors made investigations in an attempt to develop an advantageous method of producing such epoxidized polyesters.

Hydrogen peroxide is a so-far known epoxidizing agent. However, any technology is not known for commercial epoxidization of high-molecular-weight polyesters with hydrogen peroxide. According to the results of a study made by the present inventors, this is presumably because (1) the reaction involving hydrogen peroxide is a non-homogeneous reaction and the rate-determining step is the contact between the aqueous hydrogen peroxide solution layer and the oily starting material layer, so that the rate of reaction is slow with high-molecular-weight polyesters which are highly viscous, (2) for handling and safety reasons, hydrogen peroxide is generally used in the form of an aqueous solution having a concentration of at most 60% and, when the rate of epoxidization is slow, this allows increased secondary reactions, such as addition of water, catalyst and/or cocatalyst to the epoxy groups formed, whereby the selectivity decreases and/or the reaction system acquires an increased viscosity or even turns into a gel, and (3) the aqueous phase thus becomes less separable and problems arise, for example postreaction treatment procedures, such as washing with water, become difficult. This tendency is more remarkable with hydroxyl group-containing polyesters, hence the epoxidization of hydroxyl group-containing polyesters has been considered more difficult.

As a result of their intensive investigations made to solve these problems, the present inventors found that the desired epoxidized polyesters can be produced in a commercially advantageous manner (1) when the epoxidization is performed in the presence of a specific weakly basic compound using a specific solvent or (2) when the epoxidization is conducted in a nonaqueous system using peracetic acid.

Accordingly it is an object of the invention to provide novel and useful epoxidized polyesters and a commercially advantageous method of producing said epoxidized polyesters.

SUMMARY OF THE INVENTION

The invention thus provides epoxidized polyesters which are characterized in that they comprise, per molecule, at least three bifunctional groups (hereinafter referred to as "epoxycyclohexane groups") each independently having the general formula

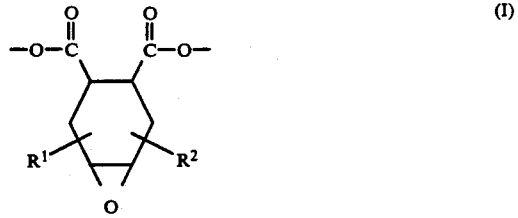

wherein $R^1$ and $R^2$ are the same or different and each is a hydrogen atom or an alkyl group containing 1 to 5 carbon atoms, or $R^1$ and $R^2$ taken together represent an endomethylene group, and have a number average molecular weight of about 1,000 to about 10,000.

The invention also provides a method of producing the epoxidized polyesters mentioned above which comprises epoxidizing a polyester (hereinafter referred to as "starting polyester") comprising, per molecule, at least three bifunctional groups (hereinafter referred to as "epoxycyclohexene groups") each independently having the general formula

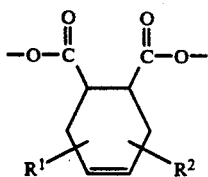

(II)

wherein R$^1$ and R$^2$ are as defined above, and having a number average molecular weight of about 1,000 to about 10,000, either with hydrogen peroxide in a hydrocarbon type solvent and/or an ester type solvent in the presence of a weakly basic compound or with peracetic acid in a nonaqueous system.

DETAILED DESCRIPTION OF THE INVENTION

The number of epoxycyclohexane groups contained in the epoxidized polyester according to the invention is at least three per molecule and preferably within the range of 3 to 50, preferably 3 to 30, per molecule. Those epoxidized polyesters in which said number is less than 3, when used as constituents of cationically polymerizable resin compositions, cationically polymerizable photocurable resin compositions, epoxy resin compositions and the like, show insufficient curability and, furthermore, they fail to satisfactorily stabilize polyvinyl chloride resins.

The epoxidized polyesters of the invention have a molecular weight (number average molecular weight) of about 1,000 to about 10,000, preferably about 1,000 to about 5,000. When the molecular weight is below 1,000, the curability in photocuring or acid anhydride curing, for instance, is good but the cured products obtained are brittle and have unsatisfactory flexibility. When low-molecular-weight ones having a molecular weight of below 1,000 are used as components of polyvinyl chloride resin compositions, the bleeding tendency is unfavorably pronounced and the solvent extractability or the migration tendency is remarkable. Conversely, when the molecular weight exceeds 10,000, resin compositions prepared tend to have a high viscosity, a decreased solubility in solvents, and decreased processability.

Furthermore, the iodine value of said epoxidized polyesters should recommendably be not more than 4, more preferably not more than 2.5. When cationically polymerizable resins, ultraviolet-curable resins, epoxy resins, and stabilizers for polyvinyl chloride resins as prepared by using epoxidized polyesters having an iodine value higher than 4 are exposed to outdoor conditions, the materials tend to yellow and show decreased weather resistance.

In addition, it is preferable that said epoxidized polyesters have an oxirane oxygen content of about 0.5 to 10% by weight based on said epoxidized polyesters.

The epoxidized polyesters of the invention can be produced on a commercial scale by epoxidizing a starting polyester which comprises, per molecule, at least three bifunctional groups, or cyclohexene groups, each independently having the general formula (II) and which has a number average molecular weight of about 1,000 to about 10,000.

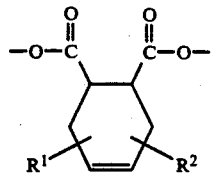

(II)

wherein R$^1$ and R$^2$ are as defined above.

The above starting polyester can be prepared by polyesterifying a dibasic acid containing a cyclohexene group or an acid anhydride thereof (hereinafter referred to as "primary acid component") with a dihydric alcohol. For improving physical properties of cured products, it it also possible to combinedly use another dibasic acid, a polybasic (e.g. tribasic) acid, or an acid anhydride thereof (hereinafter referred to as "secondary acid component") and/or a polyhydric (e.g. trihydric) alcohol for polyesterification. It is further possible to combinedly use a monohydric alcohol or a monobasic organic acid for polyesterification for blocking the terminal hydroxyl or carboxyl groups.

The combined use of the secondary acid component can be effective for preventing such secondary reactions as addition of water, catalyst and/or cocatalyst to the epoxy groups formed and further for avoiding such problems as decreased separability of the aqueous phase in the postreaction washing step. The primary acid component/secondary acid component mole ratio is preferably within the range of 100/0 to 40/60. This is important particularly in the production of hydroxyl group-containing epoxidized polyesters. When said ratio is lower than 40/60, the number of epoxycyclohexane groups in the molecule decreases and therefore the product epoxidized polyesters, when applied to cationically polymerizable resins, ultraviolet-curable resins or epoxy resins or as stabilizers for polyvinyl chloride resins, for instance, give inferior performance characteristics.

Specifically, the starting polyester is prepared by subjecting (a) at least one primary acid component selected from the group consisting of an acid of the formula (IIa)

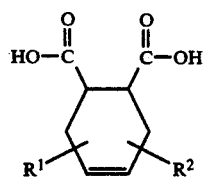

(IIa)

wherein R$^1$ and R$^2$ are the same or different and each represents a hydrogen atom or an alkyl group containing 1 to 5 carbon atoms, or R$^1$ and R$^2$ taken together represent an endomethylene group, and an anhydride thereof, (b) at least one secondary acid component selected from the group consisting of:

(i) an aliphatic or alicyclic polycarboxylic acid of the formula (III)

R$^3$—(COOH)$_n$ (III)

wherein n is an integer of 2–4 and R$^3$ is a saturated or unsaturated aliphatic hydrocarbon residue having 1 to 36 carbon atoms which may have 1-6 substituents selected from the group consisting of hydroxyl group, halogen atom and $C_1$-$C_{10}$ alkyl group or $R^3$ is a saturated alicyclic hydrocarbon residue having 4 to 30 carbon atoms which may have 1-6 substituents selected from the group consisting of hydroxyl group, halogen atom and $C_1$-$C_{10}$ alkyl group, and an anhydride thereof, and (ii) an aromatic polycarboxylic acid of the formula (IV)

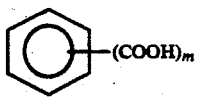   (IV)

wherein m is an integer of 2-4, and an anhydride thereof and an aromatic polycarboxylic acid of the formula (V)

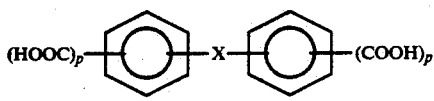   (V)

wherein p is an integer of 1 or 2, and X is a single bond, —O—, —S—, —SO—, —SO$_2$—, —CH$_2$—, —C(CH$_3$)$_2$— or

and an anhydride thereof, (c) at least one monocarboxylic acid having 1 to 24 carbon atoms, (d) at least one member selected from the group consisting of a dihydric alcohol having 2-55 carbon atoms and a polyhydric alcohol containing at least 3 hydroxyl groups and having 3-24 carbon atoms, and (e) at least one monohydric alcohol having 1 to 24 carbon atoms to polyesterification reaction in the presence or absence of an esterification catalyst at about 100° to about 300° C. under atmospheric or reduced pressure, wherein the components (a)-(e) are used in the following proportions:

```
(a):(b) = 100:0 to 40:60,
[(a) + (b)]:(c) = 100:0 to 30:70
  (preferably 100:0 to 50:50)
(d):(e) = 100:0 to 20:80
  (preferably 100:0 to 40:60)
``` and the total number of moles of the hydroxyl groups contained in the component (d) and in the component (e) and/or component (b) having at least one hydroxyl group, if any, is about 0.8 to about 1.5, preferably 0.9-1.4, times the total number of moles of carboxyl groups contained in the component (a) and in the component (b) and/or component (c) if any (wherein if acid anhydride is used, one mole of acid anhydride group thereof is counted as 2 moles of carboxyl group).

As seen from the foregoing proportions of the components (a)-(e), the component (a), i.e., an acid of the formula (IIa) or an anhydride thereof, and the component (d), i.e., a dihydric alcohol having 2-55 carbon atoms and/or a polyhydric alcohol containing at least 3 hydroxy groups and having 3-24 carbon atoms are essential in the invention. The components (b), (c) and (e) may be used if so desired. The total number of moles of the hydroxyl groups contained in the alcoholic component(s) is about 0.8 to about 1.5 times the total number of moles of the carboxyl groups contained in the acid component(s). If at least one of components (b) and (c) is (are) used in addition to component (a), the carboxyl group(s) thereof should also be included in calculating the total number of moles of carboxyl groups. Furthermore, when such acid component (a) and if desired at least one of components (b) and (c) is (are) used in the acid anhydride form, the calculation should be done by assuming that one mole of acid anhydride group corresponds to 2 moles of carboxyl group. If monohydric alcohol component (e) is used in addition to polyhydric alcohol component (d), the hydroxyl group(s) of component (e) should also be included in calculating the total number of moles of hydroxyl groups. If secondary acid component (b) having at least one hydroxyl group is used, the hydroxyl group(s) of such component (b) should also be included in calculating the total number of moles of hydroxyl groups.

Preferable examples of the above-mentioned primary acid component (a) are Δ$^4$-tetrahydrophthalic acid, 3-methyl-Δ$^4$-tetrahydrophthalic acid, 4-methyl-Δ$^4$-tetrahydrophthalic acid, Δ$^4$-nadic acid, methyl-Δ$^4$-nadic acid, and acid anhydrides thereof.

The secondary acid component (b) include (i) the foregoing aliphatic and alicyclic polycarboxylic acids of the formula (III) and (ii) the foregoing aromatic polycarboxylic acid of the formulas (IV) and (V). Preferable examples of said aliphatic and alicyclic polycarboxylic acids are maleic acid, fumaric acid, malonic acid, succinic acid, dodecenylsuccinic acid, glutaric acid, adipic acid, pimelic acid, suberic acid, azelaic acid, sebacic acid, brassylic acid, dodecanedioic acid, citric acid, isocitric acid, aconitic acid, tartaric acid, hexahydrophthalic acid, methylhexahydrophthalic acid, cyclohexanetetracarboxylic acid, tricarboxycyclopentylacetic acid, cyclopentanetetracarboxylic acid, cyclobutanetetracarboxylic acid, 3,5,6-tricarboxylnorbornane-2-acetic acid, HET acid, tetrabromophthalic acid, tricarballylic acid, butanetetracarboxylic acid and anhydrides of these polybasic acids. Preferable examples of said aromatic polycarboxylic acids are phthalic acid, isophthalic acid, terephthalic acid, trimellitic acid, pyromellitic acid, benzophenonetetracarboxylic acid, benzophenonedicarboxylic acid, biphenyldicarboxylic acid, diphenylsulfonetetracarboxylic acid, diphenylsulfonedicarboxylic acid, biphenyltetracarboxylic acid, diphenyl ether tetracarboxylic acid, diphenyl ether dicarboxylic acid, bis(3,4-dicarboxyphenyl)sulfoxide, 2,2-bis(3,4-dicarboxyphenyl)propane, and anhydrides thereof.

While either of the aliphatic and alicyclic polycarboxylic acids or the aromatic polycarboxylic acids can be used as the secondary acid component (b) in the present invention, it is preferable to use at least one member selected from the group consisting of said saturated aliphatic polycarboxylic acid and said saturated alicyclic polycarboxylic acid, especially when the epoxidized polyester obtained is to be used for applications wherein weather resistance is required.

The monocarboxylic acid (c) is, for example, caproic acid, caprylic acid, 2-ethylhexanoic acid, capric acid, lauric acid, myristic acid, palmitic acid, stearic acid, oleic acid, or linolic acid.

Of the component (d), the dihydric alcohol includes, among others, ethylene glycol, diethylene glycol, polyethylene glycol (preferably having a molecular weight of about 1,000 or less), propylene glycol, dipropylene glycol, polypropylene glycol (preferably having a molecular weight of about 1,000 or less), neopentyl glycol, 1,3-butanediol, 1,4-butanediol, 1,6-hexanediol, 1,4-cyclohexanedimethanol, xylylene glycol, bisphenol A, hydrogenated bisphenol A, bisphenol A-ethylene glycol (1-20 moles) adducts, hydrogenated bisphenol A-ethylene glycol (1-20 moles) adducts, and bisphenol F. The polyhydric alcohol containing at least 3 hydroxyl groups includes, among others, glycerol, trimethylolpropane, trimethylolethane, pentaerythritol, dipentaerythritol, and sorbitol.

The monohydric alcohol (e) is, for example, butanol, hexanol, 2-ethylhexanol, octanol, decanol, isodecanol, lauryl alcohol, myristyl alcohol, palmityl alcohol, stearyl alcohol, or oleyl alcohol.

Production of starting polyesters: polyesterification step

The polyesterification can be carried out either without any catalyst or in the presence of an appropriate esterification catalyst conventionally used.

As such esterification catalyst, there may be mentioned, for instance, protonic acids such as paratoluenesulfonic acid, phosphoric acid and sulfuric acid, solid acids such as zeolite, silica and alumina, tin compounds such as stannous oxide and organotin esters, titanate compounds, aluminum alcoholate compounds, and basic inorganic compounds such as zinc oxide, magnesium oxide and calcium oxide. The amount of the catalyst to be used is suitably determined from a wide range and usually ranges from about 0.01 to 3 % by weight based on the total weight of the acid and alcohol starting materials used.

The esterification conditions are not critical provided that the desired effects can be produced. Generally, however, dehydration is carried out at a temperature of 100° to 300° C. at atmospheric pressure or under reduced pressure. The dehydration may be accelerated by blowing an inert gas, such as nitrogen or carbon dioxide gas, into the reaction mixture or by carrying out the reaction in a refluxing azeotropic solvent such as xylene or toluene or hexane. The reaction pressure may vary depending on the composition of the starting materials (i.e., vapor pressure of the starting materials) or depending on the presence or absence of an azeotropic solvent, but preferably ranges from atmosphenic pressure to about 10 mmHg. The polyesterification reaction is usually carried out until the polyester will have the desired molecular weight, generally for about 2-20 hours. The reaction product may be used as a starting material for epoxidization either without eliminating the catalyst, if used, or after removing the catalyst.

Particularly when a hydroxyl group-containing polyester is used as the starting polyester, the epoxidized polyester obtained, when used in cationically polymerizable resin compositions, ultra-violet curable resin compositions, epoxy resin compositions, improves the adhesion of cured product thereof to metallic or plastic materials, and when used in applications where a filler, pigment or the like is used, allows good dispersion thereof. In the latter case, the adhesion of resins to the filler or pigment is improved, and therefore the cured products are substantially free from chalking and have excellent weather resistance. Furthermore, said hydroxyl group-containing epoxidized polyester, when used in epoxy resin compositions, improves the curability thereof. Said epoxidized polyester can also be effectively used when a curing agent reacting with hydroxy groups, for example an isocyanato- or silanol-containing curing agent, is combinedly used.

Such hydroxy-containing polyester to serve as a starting material for an epoxidized polyester can readily be produced by charging raw materials in a mole ratio such that the number of moles of the hydroxyl group is greater than that of the carboxyl group and carrying out the esterification in the same manner as mentioned above. Here, if the component (b) having at least one hydroxyl group is used, the hydroxyl group(s) of such component (b) is also included in the number of moles of the hydroxyl group herein. Furthermore, if an acid anhydride is used, one mole of such acid anhydride group is counted as 2 moles of carboxyl group. The hydroxyl value of said hydroxy-containing polyester is preferably about 10 to about 150, more preferably about 40 to about 120. In addition, it is preferable that said starting polyesters have an acid value of 50 or less (preferably 30 or less) and an iodine value of about 8 to about 130.

Epoxidizing step 1: epoxidization with hydrogen peroxide (hydrogen peroxide process)

The starting polyester obtained in the above step is dissolved in a hydrocarbon solvent and/or an ester solvent, and epoxidized with hydrogen peroxide in the presence of an epoxidization catalyst, a cocatalyst for epoxidization, and a weakly basic compound.

The solvent mentioned above should preferably be poorly compatible with water and, more specifically, the solubility of water in said solvent should desirably be not more than 20 g/100 g, preferably not more than 5 g/100 g. When said solubility exceeds 20 g/100 g, secondary reactions such as the addition of water to the epoxy groups formed occur unfavorably to an increased extent.

As solvents which meet such solubility requirement, there may be mentioned, among others, aromatic hydrocarbons having 6 to 15 carbon atoms, such as benzene, xylene, toluene, ethylbenzene and isopropylbenzene; aliphatic acyclic or cyclic hydrocarbons having 4 to 30 carbon atoms, such as cyclohexane, heptane, hexane, octane and kerosene; and esters having 3 to 15 carbon atoms, such as ethyl acetate, butyl acetate, cellosolve acetate (ethylene glycol monoethyl ether acetate), carbitol acetate (diethylene glycol monoethyl ether acetate), methyl acetoacetate, ethyl acetoacetate, methyl propionate, dimethyl phthalate and diethyl phthalate.

The amount of the solvent may vary depending on the viscosity of the starting polyester. Generally, however, the solvent is preferably used in an amount of about 5 to 200% by weight relative to the starting polyester. In an amount less than 5% by weight, the rate of reaction becomes unsatisfactory due to the high viscosity of the reaction system. Conversely, when the amount of the solvent is above 200% by weight, the rate of reaction decreases with the decrease in the concentration of the starting polyester and this unfavorably results in an increased cost of production.

As the weakly basic compound, there may be mentioned carbonates such as sodium carbonate, potassium carbonate, sodium hydrogen carbonate and potassium hydrogen carbonate; phosphates such as sodium or potassium salts of metaphosphoric acid, orthophosphoric acid, pyrophosphoric acid, polyphosphoric acid or hypophosphorous acid; silicates such as sodium or potassium salts of orthosilicic acid or metasilicic acid; acetates such as sodium acetate, potassium acetate, etc.

Recommendably, the weakly basic compound is added in an amount of about 0.05 to 3% by weight relative to the starting polyester. At addition levels below 0.05% by weight, the inhibitory effect on secondary reactions such as addition of water to the epoxy groups formed is insufficient, while at addition levels higher than 3% by weight, the rate of reaction decreases and, as a result, the decrease in iodine value becomes unfavorably insufficient.

The epoxidization catalyst is, for example, formic acid, an alkali metal salt of tungstic acid or molybdic acid, $\Delta^1$-tetrahydrophthalic anhydride, acetic acid, trifluoroacetic acid, monochloroacetic acid, etc. In particular, when formic acid, sodium tungstate or $\Delta^1$-tetrahydrophthalic anhydride, among others, is used, secondary reactions can be prevented and the rate of reaction can be especially increased.

The catalyst is preferably used in an amount of about 5 to 100 mole percent, more preferably about 5 to 50 mole percent, relative to the total number of moles of cyclohexene groups of the starting polyester. At levels lower than 5 mole percent, the rate of reaction is slow. At levels exceeding 100 mole percent, secondary reactions, such as addition of water, catalyst and/or cocatalyst to the epoxy groups formed, unfavorably occur to an increased extent.

As examples of the cocatalyst, there may be mentioned, among others, inorganic acids such as phosphoric acid, phosphorous acid, hypophosphorous acid, boric acid and sulfuric acid; organic protonic acids such as paratoluenesulfonic acid and methanesulfonic acid; and solid acids such as cation exchange resins and acidic zeolite. For preventing secondary reactions and increasing the rate of reaction, phosphoric acid, boric acid and cation exchange resins are preferred. It is also possible to use, as a cocatalyst, the salt obtained by reacting the above-mentioned cocatalyst with the above-mentioned weakly basic compound.

The level of addition of such cocatalyst is preferably within the range of about 0.3 to about 10 mole percent relative to the total number of moles of cyclohexene groups of the starting polyester. At addition levels below 0.3 mole percent, the rate of reaction is slow. At levels exceeding 10 mole percent, secondary reactions, such as addition of water or cocatalyst to the epoxy groups formed, occur to an unfavorably increased extent.

Any commercial grade of hydrogen peroxide may be used for the epoxidization mentioned above. The concentration should preferably be high, however. Hence, a 60% aqueous solution is generally preferred.

Hydrogen peroxide is preferably used in an amount of about 100 to about 300 mole percent relative to the total number of moles of cyclohexene groups of the starting polyester. In an amount below 100 mole percent, the iodine value hardly decreases to 4 or below. The use in an amount larger than 300 mole percent will result in a disadvantageously increased cost of production.

The order of addition of the weakly basic compound, catalyst, cocatalyst and hydrogen peroxide is not critical. It is recommended, however, that the weakly basic compound, catalyst and cocatalyst should be added and then hydrogen peroxide be added dropwise, or the four should be charged simultaneously.

Preferably, the reaction is carried out at a temperature of about 40° to 90° C. At a temperature below 40° C., the reactivity remains at a low level. Temperatures exceeding 90° C. are undesirable since secondary reactions, such as addition of water, catalyst and/or cocatalyst to the epoxy groups formed, become remarkable and hydrogen peroxide is decomposed at an increase rate. The reaction is conducted usually at atmospheric pressure but may also be conducted under reduced or elevated pressure. The reaction time may range from about 1 to about 15 hours.

After completion of the reaction, the thus-obtained epoxidized polyester can be recovered by washing the reaction mixture with water, then neutralizing or treating said mixture with a neutralizing agent (e.g. sodium hydrogen carbonate) to a pH of 5 to 9 to thereby decompose the remaining portion of hydrogen peroxide, washing the same again with water, and removing the solvent by topping. In cases where the solvent removal is not essential, the mixture obtained after azeotropic dehydration using a solvent may be used or shipped as the desired product.

Epoxidization of hydroxy-containing starting polyesters can also be achieved essentially in the above manner.

Epoxidization step 2: epoxidization with peracetic acid
(peracetic acid process)

The epoxidized polyester of the present invention can also be produced by epoxidizing the starting polyester with peracetic acid in a nonaqueous system. More specifically, the starting polyester is dissolved in a solvent selected from among ketone type solvents, hydrocarbon solvents, ester type solvents and glacial acetic acid, and then epoxidized with peracetic acid.

The method of producing peracetic acid for use in the above epoxidization is not critical. Thus, more specifically, peracetic acid produced by oxidation of acetaldehyde by the AMP method, gaseous phase method or liquid phase method or peracetic acid produced by acetylation of hydrogen peroxide may be used, among others.

Peracetic acid is preferably used in an amount of 100 to 300 mole percent relative to the total number of moles of cyclohexene groups contained in the starting polyester. In amounts below 100 mole percent, the iodine value can hardly be reduced to 4 or below. In amounts larger than 300 mole percent, the cost of production disadvantageously increases.

The starting polyester is dissolved in a solvent selected from among ketone solvents having 3 to 10 carbon atoms such as acetone, methyl ethyl ketone and methyl isobutyl ketone, the hydrocarbon solvents mentioned above, the ester solvents mentioned above, glacial acetic acid, and mixtures of two or more of these, and then subjected to epoxidization. Said solvent is preferably used in an amount of not more than 200% by weight but at least 5% by weight relative to the starting polyester.

The reaction is preferably carried out at a temperature of about 0° to about 100° C. At a temperature below 0° C., the rate of reaction is slow and it is difficult to lower the iodine value of the epoxidized polyester to 4 or below. Reaction temperatures above 100° C. are undesirable since secondary reactions such as addition of byproduct acetic acid to epoxy groups and the decomposition of peracetic acid become remarkable. The reaction is conducted usually at atmospheric pressure but may also be conducted under reduced or elevated pressure. The reaction time may range from about 1 to 15 hours.

The reaction may be carried out either batchwise or in a multistage continuous manner.

The after-treatment procedure is not critical. Thus, for example, such low volatility components as the byproduct acetic acid and solvent are removed by distillation under reduced pressure.

The epoxidized polyesters of the invention are materials suited for use in cationically polymerizable resin compositions, cationically polymerizable ultraviolet-curable resin compositions and epoxy resin compositions curable with a variety of curing agents such as amines or phenols, and as stabilizers for polyvinyl chloride resin compositions. Said epoxidized polyesters provide such compositions with good weather resistance and render them suited for outdoor use.

The following examples illustrate the invention in further detail.

In the examples, the number average molecular weight (Mn) of the desired product in each example was expressed in terms of polystyrene equivalent following analysis of gel permeation chromatography measurement results. The number (X) of cyclohexene groups per molecule, the number (A) of epoxycyclohexane groups per molecule the conversion of cyclohexene group by epoxidization and the selectivity of giving epoxycyclohexane group were calculated as follows:

$$X = (IV[PE]/IV[THPA]) \times Mn[PE] \times (1/Mw[THPA])$$

$$Z = [(OX - OX/16) \times 253.8/IV[PE]] \times X \times [Mn[EPE]/Mn[PE]]$$

Conversion (%) = $(1 - IV[EPE]/IV[PE]) \times 100$

Selectivity (%) =

$$OX - OX \times \frac{100 + (IV[PE] - IV[EPE]) \times 16/(2 \times 126.9)}{100 \times (IV[PE] - IV[EPE]) \times 16/(2 \times 126.9)} \times 100$$

where

| | |
|---|---|
| IV[PE] = | the iodine value of the polyester; |
| IV[EPE] = | the iodine value of the epoxidized polyester |
| IV[THPA] = | the iodine value of the tetrahydrophthalic anhydride used; |
| Mn[PE] = | the number average molecular weight of the polyester; |
| Mn[EPE] = | the number average molecular weight of the epoxidized polyester; |
| Mw[THPA] = | the molecular weight of the tetrahydrophthalic anhydride used; |
| OX—OX = | oxirane oxygen. |

The epoxidized polyesters obtained were evaluated for their performance characteristics by the following methods.

Characteristics of acid anhydride-cured products

Curing conditions: To the epoxidized polyester was added 4-methylhexahydrophthalic anhydride in an amount corresponding to 0.9 equivalent relative to the total number of moles of epoxy groups of said polyester. Stannous octylate was incorporated as a cocatalyst for curing in an amount of 1% by weight based on the epoxidized polyester and, after defoaming, 20 g of the mixture was placed in a 50 cm³ polypropylene beaker containing a JIS No. 2 M16 spring washer in the center thereof, and cured at 130° C. for 10 hours and then further at 150° C. for 10 hours.

Tg The glass transition temperature was determined by DSC (differential scanning calorimetry).

Flexibility: The above cured product was dipped in dry ice-methanol (−20° C.) and macroscopically examined for occurrence or non-occurrence of peeling or cracking.

Characteristics of ultraviolet-cured products

Curing conditions: Triphenylphosphonium hexafluorophosphate (as a cationic polymerization catalyst for photocuring) was dissolved, to a concentration of 1 mole percent on the epoxy group basis, in a 50% (by weight) solution of the epoxidized polyester in acetone, and the solution was applied to a standard test panel [150×50×0.3 mm, JIS G-3303 (SPTE)] to a thickness of 50 μm. After drying at 50° C. and 3 mmHg for 2 hours, the film was irradiated with ultraviolet light from a distance of 4 cm for 1 minute using a high-pressure mercury lamp (1 Kw/12.5 cm) of an irradiator for ultraviolet curing (UE011-227-01, Eye Graphics Co.)

Gelation property: The above test panel having the cured film thereon was immersed in 50 ml of chloroform for 24 hours, and then evaluated for gelation property based on the extent of the remaining cured product. The gelation herein refers to the phenomenon that the epoxidized polyester loses its fluidity due to the three-dimensional crosslinking caused by UV irradiation.

Weather resistance test: The test panel having the cured film thereon was subjected to weatherometer testing for 500 hours and then the degree of yellowing of the film was evaluated.

Characteristics as additives for non-rigid polyvinyl chloride (PVC)

| | |
|---|---|
| Polyvinyl chloride (Zeon 101EP, Nippon Zeon) | 100 weight parts |
| Dioctyl phthalate | 50 weight parts |
| Calcium stearate | 0.3 weight part |
| Zinc stearate | 0.2 weight part |
| Epoxidized polyester | 3 weight parts |

Preparation of test specimens: The above ingredients were mingled and kneaded at 165° C. for 4 minutes and the mixture was molded into a colorless and transparent non-rigid PVC sheet (1 mm thick) by pressing at 165° C. and 100 Kg/cm² for 10 minutes.

Heat stability: The test specimens prepared from the above sheet were allowed to stand at 170° C. for 1 hour and macroscopically examined for the degree of coloration.

Bleed resistance: The above test specimens were immersed in running water and macroscopically examined for the degree of whitening.

PRODUCTION EXAMPLE 1

A flask was charged with 608 g (4 moles) of Δ⁴-tetrahydrophthalic anhydride (hereinafter, THPA), 270 g (3 moles) of 1,4-butanediol, 286 g (2.2 moles) of 2-ethylhexanol, 0.05% by weight (based on the total weight of the three starting materials just mentioned above) of stannous oxide and 3% by weight (on the same basis) of xylene. The mixture was heated; the temperature was gradually raised from 160° C. to 210° C. under azeotropic dehydration with xylene while the pressure was reduced from 760 mmHg to 450 mmHg. The reaction was carried out for 10 hours to give a polyester having an acid value of 0.5. The xylene was removed by topping, and the residue was neutralized with sodium hydroxide, washed with water, dehydrated, and filtered. After these steps, a polyester was obtained: acid value 0.1, hydroxyl value 10, iodine value 91.5, and Mn 1,200. X was 4.4.

EXAMPLE 1

A 100-g portion of the polyester obtained in PRODUCTION EXAMPLE 1 was dissolved in 50 g of xylene, and the solution was heated to 65° C. Then 5 g of formic acid, 1.9 g of Amberlyst 15 (cation exchange resin; Rohm and Haas Japan) and 0.1 g of sodium acetate were added to the solution with stirring. Then, 36.8 g (mole percent relative to the total number of moles of the cyclohexene groups in the polyester used (hereinafter referred to as "A")=180 mole percent) of 60% hydrogen peroxide (aqueous solution) was added dropwise over 10 minutes, and the resultant mixture was maintained at 65° C. for 6 hours for effecting epoxidization. The reaction mixture was washed with 100 g of 10% (by weight) aqueous solution of sodium chloride, neutralized with 5% (by weight) sodium carbonate to pH 8 and further washed with 100 g of 10% (by weight) aqueous solution of sodium chloride, and the xylene and water were removed by topping to give an epoxidized polyester as a highly viscous liquid (oxirane Oxygen: 4.7% by weight, iodine value: 1.8, Mn: 1,300, Z: 3.9, Conversion: 98.0%, Selectivity: 87.8%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the posttreatment steps. No layer separability decrease was observed in the washing steps. The treatment procedure was thus efficient. The product had the following characteristics:

Characteristics of acid anhydride-cured product
Flexibility good, Tg 145° C.
Characteristics of ultraviolet-cured product
Gelation good, weather resistance good.
Characteristics as PVC additive
Heat stability good, bleed resistance good.

EXAMPLE 2

A solution of 100 g of the polyester obtained in PRODUCTION EXAMPLE 1 in 50 g of xylene was heated to 65° C. Then, 5 g of formic acid, 1 g of phosphoric acid and 0.1 g of sodium carbonate were added thereto with stirring, 40.8 g (A=200 mole percent) of 60% aqueous solution of hydrogen peroxide was added dropwise over 10 minutes, and the mixture was maintained at 65° C. for 6 hours for epoxidization. The reaction mixture was then treated in the same manner as in Example 1 to give an epoxidized polyester as a highly viscous liquid (oxirane oxygen: 5.0% by weight, iodine value: 2.8, Mn: 1,300, Z: 4.1, Conversion: 96.9%, Selectivity: 94.4%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product showed the following characteristics:

Characteristics of acid anhydride-cured product
Flexibility good, Tg 147° C.
Characteristics of ultraviolet-cured product
Gelation good, weather resistance good.
Characteristics as PVC additive
Heat stability good, bleed resistance good.

EXAMPLE 3

A solution of 100 g of the polyester obtained in PRODUCTION EXAMPLE 1 in 50 g of xylene was heated to 65° C. Then, 7 g of formic acid, 1 g of disodium hydrogen phosphate and 0.05 g of sodium carbonate were added with stirring, and 40.8 g (A=200 mole percent) of 60% aqueous solution of hydrogen peroxide was then added dropwise over 10 minutes, and the resultant mixture was maintained at 65° C. for 6 hours for epoxidization. The reaction mixture was then treated in the same manner as in Example 1 to give an epoxidized polyester as a highly viscous liquid (oxirane oxygen: 4.6% by weight, iodine value: 2.8, Mn: 1,300, Z: 3.8, Conversion: 96.9%, Selectivity: 86.9%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product showed the following characteristics:

Characteristics of acid anhydride-cured product
Flexibility good, Tg 144° C.
Characteristics of ultraviolet-cured product
Gelation good, weather resistance good.
Characteristics as PVC additive
Heat stability good, bleed resistance good.

EXAMPLE 4

A solution of 100 g of the polyester obtained in PRODUCTION EXAMPLE 1 in 50 g of xylene was heated to 65° C., and 6 g of formic acid, 0.63 g of boric acid and 0.54 g of sodium metasilicate were added with stirring. Then, 40.8 g (A=200 mole percent) of 60% aqueous solution of hydrogen peroxide was added dropwise over 10 minutes and the mixture was maintained at 65° C. for 6 hours for epoxidization. The reaction mixture was then treated in the same manner as in Example 1 to give an epoxidized polyester as a highly viscous liquid (oxirane oxygen: 4.9% by weight, iodine value: 1.9, Mn: 1,300, Z: 4.0, Conversion 97.9%, Selectivity 91.6%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product showed the following characteristics:

Characteristics of acid anhydride-cured product
Flexibility good, Tg 145° C.
Characteristics of ultraviolet-cured product
Gelation good, weather resistance good.
Characteristics as PVC additive
Heat stability good, bleed resistance good.

EXAMPLE 5

A solution of 100 g of the polyester obtained in PRODUCTION EXAMPLE 1 in 50 g of xylene was heated to 65° C. Then, 6.6 g of $\Delta^1$-tetrahydrophthalic anhydride, 1 g of phosphoric acid and 0.3 g of sodium carbonate were added with stirring and 40.8 g (A=200 mole percent) of 60% aqueous solution of hydrogen peroxide was added dropwise over 10 minutes. The resultant mixture was further maintained at 65° C. for 5 hours for epoxidization. The reaction mixture was then treated in the same manner as in Example 1 to give an epoxidized polyester as a highly viscous liquid (oxirane oxygen: 4.8% by weight, iodine value: 1.4, Mn: 1,300, Z: 3.9, Conversion: 98.5%, Selectivity: 89.3%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product showed the following characteristics:

Characteristics of acid anhydride-cured product
Flexibility good, Tg 144° C.
Characteristics of ultraviolet-cured product
Gelation good, weather resistance good.
Characteristics as PVC additive
Heat stability good, bleed resistance good.

PRODUCTION EXAMPLE 2

A flask was charged with 532 g (3.5 moles) of THPA, 249 g (1.5 moles) of isophthalic acid, 269.4 g (2 moles) of trimethylolpropane, 450 g (5 moles) of 1,4-butanediol and 360 g (2.5 moles) of 2-ethylhexanoic acid, followed by addition of 0.1% by weight (based on the total amount of the starting materials mentioned above) of zinc oxide as a catalyst and 3% by weight (on the same basis) of xylene. The mixture was heated; the temperature was gradually raised from 160° C. to 220° C. under azeotropic dehydration with xylene. The reaction was carried out for 7 hours at ordinary pressure with nitrogen passed through the reaction mixture to give a polyester having an acid value of 1.2. After the esterification reaction, the xylene was removed by topping at 210° C. and 3 mmHg for 1 hour. The polyester obtained had an acid value of 1.2, a hydroxyl value of 60, an iodine value of 57.0, an Mn of 2,000 and an X value of 4.5.

EXAMPLE 6

A solution of 100 g of the polyester obtained in PRODUCTION EXAMPLE 2 in 50 g of butyl acetate was heated to 65° C., 5 g of formic acid, 1 g of phosphoric acid and 0.2 g of sodium carbonate were added with stirring. Then 22.9 g (A=180 mole percent) of 60% aqueous solution of hydrogen peroxide was added dropwise thereto over 10 minutes, and the resultant mixture was maintained at 65° C. for 7 hours for epoxidization. The reaction mixture was then treated in the same manner as in Example 1 to give an epoxidized polyester as a highly viscous liquid (oxirane oxygen: 2.1% by weight, iodine value: 1.7, Mn: 2,400, Z: 3.1, Conversion 97.0%, Selectivity 62.3%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was encountered in the washing steps. The treatment procedure was thus easy. The product had the following characteristics;

Characteristics of acid anhydride-cured product
Flexibility good, Tg 105° C.
Characteristics of ultraviolet-cured product
Gelation good, weather resistance good.

EXAMPLE 7

The procedure of Example 6 was followed except that sodium carbonate was used in an amount of 3.5 g. An epoxidized polyester was obtained as a highly viscous liquid (oxirane oxygen: 2.2% by weight, iodine value: 10.0, Mn: 2,300, Z: 3.2, Conversion 82.5%, Selectivity: 76.4%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product was comparable in curing characteristics to the polyester obtained in Example 6 but slightly inferior thereto in the weather resistance of the photocured product.

PRODUCTION EXAMPLE 3

A flask was charged with 608 g (4 moles) of THPA, 146 g (I mole) of adipic acid, 269.4 g (2 moles) of trimethylolpropane, 118 g (1 mole) of 1,6-hexanediol, 62 g (1 mole) of ethylene glycol and 390 g (3 moles) of 2-ethylhexanol, followed by addition of 0.1% by weight (based on the total amount of the starting materials mentioned above) of zinc oxide as a catalyst and 3% by weight (on the same basis) of xylene. The mixture was heated; the temperature was gradually raised from 160° C. to 220° C. under azeotropic dehydration with xylene. The reaction was carried out for 7 hours at ordinary pressure while nitrogen was blown into the reaction mixture. After the esterification reaction, the xylene was removed by topping at 210° C. and 3 mmHg for 1 hour, and the residue was used as the starting material for epoxidization. The polyester thus obtained had an acid value of 0.6, a hydroxyl value of 73.5, an iodine value of 68.5, an Mn value of 1,600 and an X value of 4.3.

EXAMPLE 8

A solution of 100 g of the starting polyester obtained in PRODUCTION EXAMPLE 3 in 50 g of butyl acetate was heated to 65° C. Then, 5 g of formic acid, 1 g of phosphoric acid and 0.3 g of sodium carbonate were added with stirring, and 30.6 g (A=200 mole percent) of 60% aqueous solution of hydrogen peroxide was then added dropwise over 10 minutes, and the mixture was maintained at 65° C. for 7 hours for epoxidization. The reaction mixture was then treated in the same manner as in Example 1 to give an epoxidized polyester as a highly viscous liquid (oxirane oxygen: 3.1% by weight, iodine value: 3.1, Mn: 1,800, Z: 3.4, Conversion: 95.5%, Selectivity: 78.3%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product showed the following characteristics:

Characteristics of acid anhydride-cured product
Flexibility good, Tg 110° C.

Characteristics of ultraviolet-cured product
Gelation good, weather resistance good.

EXAMPLE 9

A solution of 100 g of the polyester obtained in PRODUCTION EXAMPLE 3 in 100 g of butyl acetate was heated to 65° C. Then, 0.7 g of sodium tungstate, 1 g of phosphoric acid, 0.2 g of sodium carbonate and 0.2 g of cetylpyridinium chloride were added with stirring, and 30.6 g (A=200 mole percent) of 60% aqueous solution of hydrogen peroxide was added dropwise over 10 minutes, and the resultant mixture was maintained at 65° C. for 7 hours for epoxidization. The reaction mixture was then treated in the same manner as in Example 1 to give an epoxidized polyester as a highly viscous liquid (oxirane oxygen: 3.3% by weight, iodine value: 2.2, Mn: 1,700, Z: 3.5, Conversion: 96.8%, Selectivity: 82.3%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product had the following characteristics:
Characteristics of acid anhydride-cured product
Flexibility good, Tg 112° C.
Characteristics of ultraviolet-cured product
Gelation good, weather resistance good.

EXAMPLE 10

A solution of 100 g of the polyester obtained in PRODUCTION EXAMPLE 3 in 30 g of acetone was heated to 40° C. Then, a 25% solution of 103.7 g (A=150 mole percent) of peracetic acid in acetone was added dropwise thereto over 10 minutes, and the resultant mixture was maintained at 40° C. for 7 hours for epoxidization. The reaction mixture was subjected to topping at 40° C. and 3 mmHg for 1 hour, giving an epoxidized polyester as a highly viscous liquid (oxiran oxygen: 3.4 wt.%, iodine value: 1.1, Mn: 1,700, Z: 3.6, Conversion: 98.4%, Selectivity: 83.4%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product showed the following characteristics:
Characteristics of acid anhydride-cured product
Flexibility good, Tg 108° C.
Characteristics of ultraviolet-cured product
Gelation good, weather resistance good.

PRODUCTION EXAMPLE 4

The procedure of PRODUCTION EXAMPLE 2 was followed except that 581 g (3.5 moles) of 3-methyl-Δ$^4$tetrahydrophthalic anhydride was used in lieu of THPA to give a polyester with an acid value of 5.3, a hydroxyl value of 64.0, an iodine value of 49.5, an Mn value of 2,200 and an X value of 4.3.

EXAMPLE 11

A solution of 100 g of the polyester obtained in PRODUCTION EXAMPLE 4 in 50 g of butyl acetate was heated to 65° C. Then, 5 g of formic acid, 1 g of phosphoric acid and 0.2 g of sodium carbonate were added with stirring, and 22.1 g (A=200 mole percent) of 60% aqueous solution of hydrogen peroxide was added dropwise over 10 minutes, and the resultant mixture was maintained at 65° C. for 7 hours for epoxidization. The reaction mixture was then treated in the same manner as in Example 1 to give an epoxidized polyester as a highly viscous liquid (oxiane oxygen: 2.2% by weight, iodine value: 1.9, Mn: 2,600, Z: 3.6, Conversion: 96.2%, Selectivity: 75.5%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product had the following characteristics:
Characteristics of acid anhydride-cured product
Flexibility good, Tg 106° C.
Characteristics of ultraviolet-cured product
Gelation good, weather resistance good.

PRODUCTION EXAMPLE 5

The procedure of PRODUCTION EXAMPLE 2 was followed except that 219 g (1.5 moles) of adipic acid was used in place of isophthalic acid to give a polyester having an acid value of 1.0, a hydroxyl value of 57.2, an iodine value of 58.0, an Mn value of 2,100 and an X value of 4.8.

EXAMPLE 12

The procedure of Example 6 was followed except that the polyester obtained in PRODUCTION EXAMPLE 5 was used in place of the polyester obtained in PRODUCTION EXAMPLE 2. An epoxidized polyester was obtained as a highly viscous liquid (oxiane oxygen: 2.4% by weight, iodine value: 1.4, Mn: 2,400, Z: 3.6, Conversion: 97.6%, Selectivity: 69.7%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product had the following characteristics:
Characteristics of acid anhydride-cured product
Flexibility good, Tg 103° C.
Characteristics of ultraviolet-cured product
Gelation good, weather resistance good.

PRODUCTION EXAMPLE 6

The procedure of PRODUCTION EXAMPLE 2 was followed with the exception of using 760 g (5.0 moles) of THPA, 202.1 g (1.5 moles) of trimethylolpropane, 236 g (2 moles) of 1,6-hexanediol and 390 g (3.0 moles) of 2-ethylhexanol, thereby giving a polyester having an acid value of 1.8, a hydroxyl value of 45.9, an iodine value of 88.0, an Mn value of 1,300 and an X value of 4.5.

EXAMPLE 13

A 100 g quantity of the polyester obtained in PRODUCTION EXAMPLE 6 was dissolved in 100 g of toluene and the solution was heated to 65° C. Then, 10 g of formic acid, 0.45 g of phosphoric acid, 0.45 g of sodium dihydrogen phosphate dihydrate were added thereto with stirring, and 43.2 g (A=220 mole percent) of 60% aqueous solution of hydrogen peroxide was added over 10 minutes, and the resulting mixture was maintained at 65° C. for 7 hours for epoxidation. The reaction mixture was treated in the same manner as in Example 1 to give an epoxidized polyester as a highly viscous liquid (oxiane oxygen: 4.8% by weight, iodine value: 1.3, Mn: 1,400, Z: 4.2, Conversion: 98.5%, Selectivity: 92.6%). Infrared spectroscopic analysis revealed characteristic absorptions at 1730 cm$^{-1}$ due to the ester group and at 860 cm$^{-1}$ and 780 cm$^{-1}$ due to the epoxy group. No gelation occurred during the reaction or in the after-treatment steps. No layer separability decrease was observed in the washing steps. The treatment procedure was thus easy. The product had the following characteristics:

Characteristics of acid anhydride-cured product
Flexibility good, Tg 145° C.
Characteristics of ultraviolet-cured product
Gelation good, weather resistance good.

COMPARATIVE EXAMPLE 1

The procedure of Example 2 for epoxidization was followed except that acetone was used in lieu of xylene. Without washing with water, the reaction mixture was neutralized, and an acetone-water fraction was removed by topping to give an epoxidized polyester as a highly viscous liquid (oxirance oxygen: 0.5% by weight, iodine value: 2.5, Mn: 1,600, Z: 0.5, Conversion: 97.3%, Selectivity: 9.4%). Infrared spectroscopic analysis revealed characteristic absorptions at 1730 cm$^{-1}$ due to the ester group but the characteristic absorptions at 860 cm$^{-1}$ and 780 cm$^{-1}$ due to the epoxy group were obscure. This product was evaluated for acid anhydride curing characteristics. Gelation was insufficient, and hence the Tg and flexibility evaluations were impossible.

COMPARATIVE EXAMPLE 2

The procedure of Example 2 for epoxidization was followed except that the addition of sodium carbonate was omitted. After 4 hours of reaction, the reaction mixture turned into a highly viscous gel-like matter and could not be stirred any longer.

COMPARATIVE EXAMPLE 3

A flask was charged with 152 g (1 mole) of THPA, 584 g (4 moles) of adipic acid and 450 g (5 moles) of 1,4-butanediol, followed by addition of 0.1% by weight (based on the total weight of the starting materials mentioned above) of zinc oxide as a catalyst and 5% by weight (on the same basis) of xylene. The mixture was heated; the temperature was raised gradually from 160° C. to 220° C. under azeotropic dehydration with xylene. The reaction was carried out for 20 hours at ordinary pressure with nitrogen gas passed through the mixture. The reaction mixture was treated in the same manner as in PRODUCTION EXAMPLE 2 to give a polyester (acid value: 6.2, hydroxyl value: 3.2, iodine value: 28.1, Mn: 12,000, X: 13.3).

The procedure of Example 6 was followed to epoxidize 100 g of the above polyester except that the polyester was dissolved in 200 g of butyl acetate. The crude reaction product was subjected twice to reprecipitation using 1,000 g of methanol, followed by drying under reduced pressure, whereby an epoxidized polyester occurring as a solid at room temperature was obtained (oxirane oxygen: 0.8% by weight, iodine value: 3.9, Mn: 16,000, Z: 8.0, Conversion: 86.1%, Selectivity: 53.2%). Infrared spectroscopic analysis revealed characteristic absorptions at 1730 cm$^{-1}$ due to the ester group and at 860 cm$^{-1}$ and 780 cm$^{-1}$ due to the epoxy group. This product was incompatible with 4-methylhexahydrophthalic anhydride and was insufficiently cured. It was insoluble in acetone, hence could not be evaluated for ultraviolet curing characteristics.

COMPARATIVE EXAMPLE 4

In lieu of the polyester of the present invention, 3,4-epoxycyclohexylmethyl 3,4-epoxycyclohexanecarboxylate, a typical compound having two epoxycyclohexane groups, was evaluated for the characteristics with the following results:

Characteristics of acid anhydride-cured product
Flexibility poor, Tg 148° C.
Characteristics of ultraviolet-cured product
Gelation good, weather resistance rather poor.
Characteristics as PVC additive
Heat stability good, bleed resistance poor.

As detailedly explained hereinabove, the epoxidized polyesers of this invention, when applied in cationically polymerizable resin compositions, ultraviolet-curable resin compositions, and epoxy resin compositions, for instance, show good processability and good curability, and give cured products having good flexibility and, when used as stabilizers for polyvinyl chloride resins, provide good heat stability and show good bleed resistance, migration resistance and extraction resistance.

Such epoxidized polyesters can be commercially produced by the hydrogen peroxide process or peracetic acid process as disclosed herein.

We claim:

1. An epoxidized polyester which comprises, per molecule, at least three bifunctional groups each having the general formula

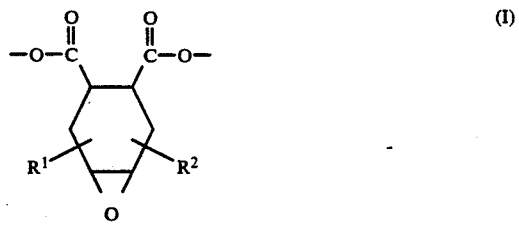

(I)

wherein R$^1$ and R$^2$ are the same or different and each is a hydrogen atom or an alkyl group containing 1 to 5 carbon atoms, or R$^1$ and R$^2$ taken together represent an endomethylene group, and which has a number average molecular weight of about 1,000 to about 10,000.

2. An epoxidized polyester according to claim 1 which is prepared by epoxidizing a starting polyester, wherein the starting polyester is a polyester prepared by subjecting (a) at least one primary acid component selected from the group consisting of an acid of the formula (IIa)

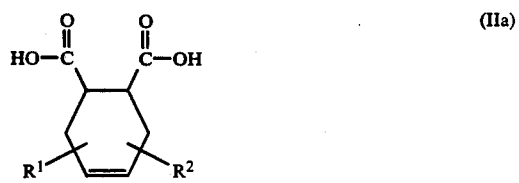

(IIa)

wherein R$^1$ and R$^2$ are the same or different and each represents a hydrogen atom or an alkyl group containing 1 to 5 carbon atoms, or R$^1$ and R$^2$ taken together represent an endomethylene group, and an anhydride thereof, (b) at least one secondary acid component selected from the group consisting of:

(i) an aliphatic or alicyclic polycarboxylic acid of the formula (III)

$$R^3-(COOH)_n \quad \text{(III)}$$

wherein n is an integer of 2–4 and $R^3$ is a saturated or unsaturated aliphatic hydrocarbon residue having 1 to 36 carbon atoms which may have 1–6 substituents selected from the group consisting of hydroxyl group, halogen atom and $C_1$–$C_{10}$ alkyl group or $R^3$ is a saturated alicyclic hydrocarbon residue having 4 to 30 carbon atoms which may have 1–6 substituents selected from the group consisting of hydroxyl group, halogen atom and $C_1$–$C_{10}$ alkyl group, and an anhydride thereof, and (ii) an aromatic polycarboxylic acid of the formula (IV)

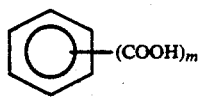

wherein m is an integer of 2–4, and an anhydride thereof and an aromatic polycarboxylic acid of the formula (V)

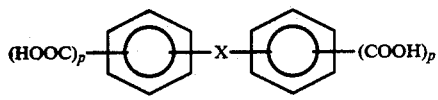

wherein p is an integer of 1 or 2, and X is a single bond —O—, —S—, —SO—, —SO$_2$—, —CH$_2$—, —C(CH$_3$)$_2$— or

and an anhydride thereof, (c) at least one monocarboxylic acid having 1 to 24 carbon atoms, (d) at least one member selected from the group consisting of a dihydric alcohol having 2–55 carbon atoms and a polyhydric alcohol containing at least 3 hydroxyl groups and having 3–24 carbon atoms, and (e) at least one monohydric alcohol having 1 to 24 carbon atoms to polyesterification reaction in the presence or absence of an esterification catalyst at about 100° to about 300° C. under atmospheric or reduced pressure, wherein the components (a)–(e) are used in the following proportions:

(a):(b) = 100:0 to 40:60,

[(a)+(b)]:(c) = 100:0 to 30:70, (d):(e) = 100:0 to 20:80, and the total number of moles of the hydroxyl groups contained in the component (d) and in the component (e) and/or component () having at least one hydroxyl group, if any, is about 0.8 to about 1.5 times the total number of moles of carboxyl groups contained in the component (a) and in the component (b) and/or component (c) if any wherein if acid anhydride is used, one mole of acid anhydride group thereof is counted as 2 moles of carboxyl group.

3. An epoxidized polyester according to claim 2 wherein the starting polyester comprises, per molecule, at least three bifunctional groups each represented by the formula (II)

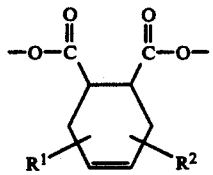

wherein $R^1$ and $R^2$ are the same or different and each represents a hydrogen atom or an alkyl group having 1 to 5 carbon atoms, or $R^1$ and $R^2$ taken together represent an endomethylene group, and has a number average molecular weight of about 1,000 to about 10,000.

4. An epoxidized polyester according to claim 3 wherein the starting polyester has a hydroxyl value of about 10 to about 150.

5. An epoxidized polyester according to claim 3 wherein the starting polyester has a hydroxyl value of about 40 to about 120.

6. An epoxidized polyester according to claim 2 wherein the primary acid component (a) is at least one member selected from the group consisting of $\Delta^4$-tetrahydro-phthalic acid, 3-methyl-$\Delta^4$-tetrahydrophthalic acid, 4-methyl-$\Delta^4$-tetrahydrophthalic acid, $\Delta^4$-nadic acid, methyl-$\Delta^4$-nadic acid, and acid anhydrides thereof.

7. An epoxidized polyester according to claim 1 wherein the secondary acid component (b) is at least one member selected from the group consisting of maleic acid, fumaric acid, malonic acid, succinic acid, dodecenylsuccinic acid, glutaric acid, adipic acid, pimelic acid, suberic acid, azelaic acid, sebacic acid, brassylic acid, dodecanedioic acid, citric acid, isocitric acid, aconitic acid, tartaric acid, hexahydrophthalic acid, methylhexahydrophthalic acid, cyclohexanetetracarboxylic acid, tricarboxycyclopentylacetic acid, cyclopentanetetracarboxylic acid, cyclobutanetetracarboxylic acid, 3,5,6-tricarboxylnorbornane-2-acetic acid, HET acid, tetrabromophthalic acid, tricarballylic acid, butanetetracarboxylic acid, phthalic acid, isophthalic acid, terephthalic acid, trimellitic acid, pyromellitic acid, benzophenone-tetracarboxylic acid, benzophenonedicarboxylic acid, diphenylsulfonetetracarboxylic acid, diphenylsulfonedicarboxylic acid, biphenyltetracarboxylic acid, biphenyldicarboxylic acid, diphenyl ether tetracarboxylic acid, diphenyl ether dicarboxylic acid, bis(3,4-dicarboxyphenyl)sulfoxide, 2,2-bis(3,4-dicarboxyphenyl)propane, and anhydrides thereof.

8. An epoxidized polyester according to claim 2 wherein the monocarboxylic acid is at least one member selected from the group consisting of caproic acid, caprylic acid, 2-ethylhexanoic acid, capric acid, lauric acid, myristic acid, palmitic acid, stearic acid, oleic acid and linolic acid.

9. An epoxidized polyester according to claim 2 wherein the dihydric alcohol is at least one member selected from the group consisting of ethylene glycol, diethylene glycol, polyethylene glycol, propylene glycol, dipropylene glycol, polypropylene glycol, neopentyl glycol, 1,3-butanediol, 1,4-butanediol, 1,6-hexanediol, 1,4-cyclohexanedimethanol, xylylene glycol, bisphenol A, hydrogenated bisphenol A, bisphenol A-ethylene glycol (1-20 moles) adducts, hydrogenated bisphenol A-ethylene glycol (1-20 moles) adducts, and bisphenol F.

10. An epoxidized polyester according to claim 2 wherein the polyhydric alcohol containing at least 3 hydroxyl groups is at least one member selected from the group consisting of glycerol, trimethylolpropane, trimethylolethane, pentaerythritol, dipentaerythritol and sorbitol.

11. An epoxidized polyester according to claim 2 wherein the monohydric alcohol is at least one member selected from the group consisting of butanol, hexanol, 2-ethylhexanol, octanol, decanol, isodecanol, lauryl alcohol, myristyl alcohol, palmityl alcohol, stearyl alcohol and oleyl alcohol.

12. An epoxidized polyester according to claim 1 which has an iodine value of 4 or less.

13. An epoxidized polyester according to claim 1 which has an iodine value of 2.5 or less.

14. A method of producing the epoxidized polyester of claim 1 which comprises subjecting a starting polyester comprising, per molecule, at least three bifunctional groups each having the formula

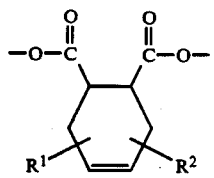

(II)

wherein $R^1$ and $R^2$ are the same or different and each represents a hydrogen atom or an alkyl group containing 1 to 5 carbon atoms, or $R^1$ and $R^2$ taken together represent an endomethylene group, and having a number average molecular weight of about 1,000 to about 10,000 to epoxidization reaction with hydrogen peroxide in at least one solvent selected from the group consisting of a hydrocarbon solvent and an ester solvent and in the presence of a weakly basic compound, an epoxidization catalyst and a cocatalyst.

15. A method according to claim 14 wherein the solvent is such that the solubility of water in said solvent is 20 g/100 g or less.

16. A method according to claim 14 wherein the solvent is selected from the group consisting of aromatic hydrocarbons having 6 to 15 carbon atoms, aliphatic acylic or cyclic hydrocarbons having 4 to 30 carbon atoms and esters having 3 to 15 carbon atoms.

17. A method according to claim 14 wherein the solvent is used in amount of about 5 to 200% by weight relative to the starting polyester.

18. A method according to claim 14 wherein the weakly basic compound is selected from the group consisting of carbonates, phosphates, silicates and acetates.

19. A method according to claim 14 wherein the weakly basic compound is used in amount of about 0.05 to 3% by weight relative to the starting polyester.

20. A method according to claim 14 wherein the epoxidization catalyst is selected from the group consisting of formic acid, an alkali metal salt of tungustic acid and molybdic acid, $\Delta^1$-tetrahydrophthalic anhydride, acetic acid, trifluoroacetic acid and monochloroacetic acid.

21. A method according to claim 14 wherein the epoxidization catalyst is used in amount of about 5 to 100 mole percent relative to the total number of moles of bifunctional groups of the formula (II) of the starting polyester.

22. A method according to claim 14 wherein the cocatalyst is selected from the group consisting of an inorganic acids, an organic protonic acid and solid acids.

23. A method according to claim 14 wherein the cocatalyst is used in an amount of about 0.3 to 10 mole percent relative to the total number of moles of bifunctional groups of the formula (II) of the starting polyester.

24. A method according to claim 14 wherein hydrogen peroxide is used in an amount of about 100 to 300 mole percent relative to the total number of moles of bifunctional groups of the formula (II) of the starting polyester.

25. A method according to claim 14 wherein the epoxidization reaction is carried out at about 40° to 90° C.

26. A method of producing the epoxidized polyester of claim 1 which comprises subjecting a starting polyester comprising, per molecule, at least three bifunctional groups each having the formula (II)

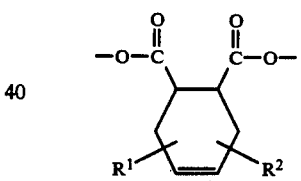

(II)

wherein $R^1$ and $R^2$ are the same or different and each represents a hydrogen atom or an alkyl group having 1 to 5 carbon atoms, or $R^1$ and $R^2$ taken together represent an endomethylene group, and has a number average molecular weight of about 1,000 to about 10,000 to epoxidization reaction with peracetic acid in a nonaqueous medium.

27. A method according to claim 26 wherein peracetic acid is used in an amount of about 100 to 300 mole percent relative to the total number of moles of the bifuntional groups of the formula (II) of the starting polyester.

28. A method according to claim 26 wherein the nonaqueous medium is at least one number selected from the group consisting of ketone solvents having 3 to 10 carbon atoms, aromatic hydrocarbons having 6 to 15 carbon atoms, aliphatic acyclic or cyclic hydrocarbons having 4 to 30 carbon atoms, esters having 3 to 15 carbon atoms and glacial acetic acid.

29. A method according to claim 27 wherein the epoxidization reaction is conducted at about 0° to 100° C.

* * * * *